Patented Mar. 16, 1937

2,073,600

UNITED STATES PATENT OFFICE 2,073,600

HETEROCYCLIC HYDRAZINES

Otto Bayer, Leverkusen-I. G.-Werk, Ernst Herdieckerhoff, Opladen, near Cologne, and Hans Schindhelm, Frankfort-on-the-Main-Fechenheim, Germany, assignors to I. G. Farbenindustrie Aktiengesellschaft, Frankfort-on-the-Main, Germany No Drawing. Application December 21, 1934, Serial No. 758,704. In Germany December 30, 1933

7 Claims. (Cl. 260—44)

The present invention relates to a process for the manufacture of heterocyclic hydrazines and to the compounds obtainable in accordance with the said process. More particularly it relates to compounds which may be represented by the probable general formula:

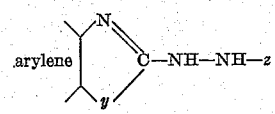

wherein $y$ stands for sulfur, oxygen or the group NH, the hydrogen atom of which may be substituted by alkyl, aryl or aralkyl, and $z$ stands for hydrogen which may be substituted by a hydrocarbon radical, such as aryl or alkyl.

Our new heterocyclic hydrazine compounds are obtainable by starting with a heterocyclic compound of the general formula:

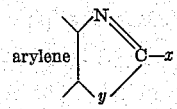

wherein $y$ means the same as stated above, and $x$ stands for hydroxyl, halogen or the sulfonic acid group, and reacting upon the same with hydrazine or a substitution product thereof, such as alkylhydrazine or phenyl- or naphthyl hydrazine or a nuclear substitution product thereof, if desired, in the presence of an inert organic solvent, and, if necessary, with the application of heat. The reaction is favorably performed by causing the two components to react upon each other in aqueous solution or suspension, and, if desired, with the addition of an organic solvent, such as alcohol or benzene.

The temperatures coming into consideration for performing the reaction can be varied within wide limits and depend upon the specific heterocyclic starting component used. Thus, as a general rule, it may be stated that, when starting with an oxazole compound, the reaction even proceeds at room temperature, suitable temperatures being from about 20° C. to about 50° C., while thiazole and imidazole compounds generally require higher temperatures, say between about 70° C. and about 100° C. or between about 100° C. and about 150° C. respectively. Further we wish to point out that the minimum temperatures at which the reaction can be performed likewise are influenced by the substituents present; in this connection it shall be mentioned that the nitro group as substituent, for example, lowers the temperature of reaction required. It is self-understood that the invention is not restricted to the limits heretofore given and that the process can be performed at other temperatures without departing from the spirit of our invention.

Instead of using the free hydrazine compounds there can be employed the salts thereof, such as the hydrochloric or sulfuric acid salts; however, in this case the free hydrazine compound must be liberated in order to perform the condensation, this being effected by adding the required quantity of an alkali, such as caustic soda lye, sodium carbonate, sodium acetate and the like.

The new heterocyclic hydrazine compounds of the above-identified general formula generally are colorless to yellowish-colored, crystalline substances, soluble in organic solvents, such as alcohol, and in dilute aqueous mineral acids but insoluble in aqueous alkalies. They are valuable intermediate products in the manufacture of dyestuffs and synthetic drugs; for example, they can be condensed easily with β-ketocarboxylic acid esters to the corresponding pyrazolones.

The invention is illustrated by the following examples, without being limited thereto:

*Example 1.*—In about 2000 parts by weight of dilute aqueous hydrazine solution corresponding to 75 parts by weight of hydrazine hydrate, 240 parts by weight of calcined sodium carbonate are dissolved, and after the addition of 170 parts by weight of 2-chlorobenzothiazole, the mixture is heated to boiling, while stirring. Refluxing is continued for several hours, whereby the 2-hydrazinobenzothiazole of the formula:

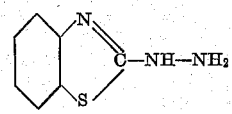

separates. After cooling, it is filtered and washed with water; if necessary, it can be purified by dissolving in dilute aqueous hydrochloric acid, filtering the solution from undissolved matter, and precipitating by adding caustic soda. The 2-hydrazinobenzothiazole thus obtained in a rather quantitative yield is easily soluble in dilute aqueous mineral acid and has the melting point of 205° C. By recrystallizing from alcohol it is obtained in form of colorless needles.

The 2-hydrazino-benzothiazole can be condensed with acetoacetic acid ester to the 1-(benzothiazolyl-2′)-3-methyl-5-pyrazolone of the melting point 231° C.

When starting with 2-halogen compounds, it is generally advantageous to work with strongly dilute hydrazine solutions since otherwise disubstitution may easily occur. Thus, for example, 2-chlorobenzothiazole and hydrazine hydrate tend to form the 2.2'-dibenzothiazolyl-hydrazine besides 2-hydrazinebenzothiazole when the solution of the hydrazine hydrate is applied in too concentrated form.

*Example 2.*—24 parts by weight of the sodium salt of benzothiazole-2-sulfonic acid are heated for some time at 95° C. in a solution of 25 parts by weight of hydrazine hydrate in 25 parts by weight of water. The bulk of the 2-hydrazinothiazole formed separates in form of a snow-white precipitate. When the reaction is complete, the mass is allowed to cool, the precipitate is filtered and washed with cold water. The yield is rather quantitative.

In an analogous manner there is prepared the 5-chloro-2-hydrazinobenzothiazole of the formula:

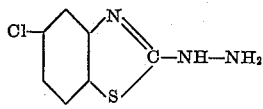

having the melting point of 218° C.

When working with solutions of other concentrations the reaction likewise proceeds uniformly.

The 2-hydrazinobenzothiazole can also be obtained by the action of 100 parts by weight of an aqueous hydrazine solution of 30% strength and of 30 parts by weight of sodium bisulfite solution upon 18 parts by weight of 2-hydroxybenzothiazole.

When starting with the 2-hydroxy compounds the formation of the corresponding hydrazine is generally favored by the addition of a sulfite, a bisulfite or sulfurous acid.

*Example 3.*—10 parts by weight of the sodium salt of the 6-ethoxybenzothiazole-2-sulfonic acid are heated with 30 parts by weight of an aqueous hydrazine hydrate solution of 30% strength at 110° C. to 120° C. in an autoclave for 2 to 3 hours. By working up in the usual manner, there is obtained in a very good yield the 6-ethoxy-2-hydrazinobenzothiazole of the formula:

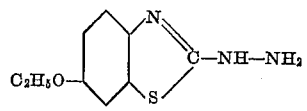

having the melting point of 175° C. to 176° C.

In an analogous manner there is obtained from 6-methoxybenzothiazole-2-sulfonic acid the 6-methoxy-2-hydrazinebenzothiazole of the melting point of 168° C. to 169° C., and from benzothiazole-2-sodium sulfonate and phenylhydrazine the 2-phenylhydrazinobenzothiazole of the melting point 227° C.

*Example 4.*—30 parts by weight of benzooxazole-2-sodium sulfonate are pasted with about 60 parts by weight of water, and thereto are added 60 parts by weight of hydrazine hydrate, while well cooling. Due to the vivid reaction which ensues care must be taken that the temperature does not exceed 20° C. Stirring is continued for several hours, and the reaction mixture is worked up in the usual manner. The 2-hydrazinobenzooxazole of the formula:

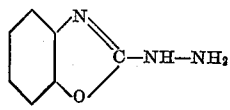

can be redissolved from water. It shows the melting point of 154° C. to 155° C. The yield is about 70–90% of theory.

In an analogous manner there are obtained from benzothiazole-2.5-disulfonic acid or 5- or 6-nitrobenzothiazole-2-sulfonic acid with hydrazine or phenylhydrazine respectively, or naphthylhydrazine respectively, or methylhydrazine respectively, the corresponding 2-hydrazine compounds.

*Example 5.*—60 parts by weight of β-naphthoxazole-2-sodium sulfonate are suspended in 400 parts by weight of dilute aqueous hydrazine of 20% strength and carefully heated to 50° C. At first the whole enters into solution, and after this, the 2-hydrazino-β-naphthoxazole of the formula:

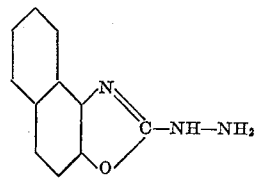

slowly begins to separate; it has the melting point of 192° C. to 193° C. The yield is rather quantitative.

The 2-hydrazino-α-naphthothiazole prepared in an analogous manner at about 110° C. and having the formula:

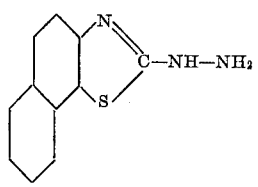

shows the melting point of 222° C. to 223° C.

In an analogous manner the corresponding 2-halogen-aryleneoxazole- or thiazole compounds yield with hydrazines the corresponding hydrazino compounds.

*Example 6.*—193 parts by weight of benzoimidazole-2-sulfonic acid are heated in an autoclave for 3 hours at 120° C. with 800 parts by weight of an aqueous hydrazine solution of 25% strength. On cooling, there separates in a rather quantitative yield and in pure form the 2-hydrazinobenzimidazole of the formula:

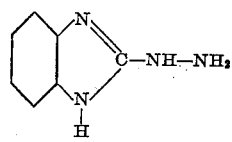

having the melting point of 221° C. to 222° C.

In an analogous manner there has been prepared the 1-methyl-2-hydrazino-benzimidazole of the formula:

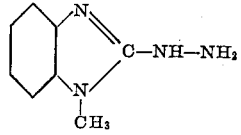

having the melting point of 201° C. to 202° C.

We claim:

1. The process which comprises reacting upon a heterocyclic compound of the general formula:

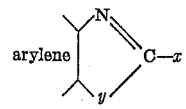

wherein $x$ stands for a member selected from the group consisting of hydroxyl, halogen and the sulfonic acid group and $y$ stands for a member selected from the group consisting of sulfur, oxygen, NH, N-alkyl, N-aryl and N-aralkyl, with a hydrazine compound.

2. The process which comprises reacting upon a heterocyclic compound of the general formula:

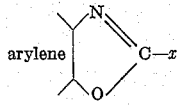

wherein $x$ stands for a member selected from the group consisting of hydroxyl, halogen and the sulfonic acid group, with a compound selected from the group consisting of hydrazine and such derivatives thereof, in which one hydrogen atom is substituted by a hydrocarbon radical at a temperature between about room temperature and about 50° C.

3. The process which comprises reacting upon a heterocyclic compound of the general formula:

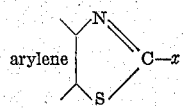

wherein $x$ stands for a member selected from the group consisting of hydroxyl, halogen and the sulfonic acid group, with a compound selected from the group consisting of hydrazine and such derivatives thereof, in which one hydrogen atom is substituted by a hydrocarbon radical at a temperature between about 70° C. and about 100° C.

4. The process which comprises reacting upon a heterocyclic compound of the general formula:

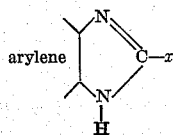

wherein $x$ stands for a member selected from the group consisting of hydroxyl, halogen and the sulfonic acid group, with a compound selected from the group consisting of hydrazine and such derivatives thereof, in which one hydrogen atom is substituted by a hydrocarbon radical at a temperature between about 100° C. and about 150° C.

5. Heterocyclic hydrazine compounds of the general formula:

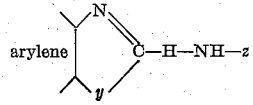

wherein $y$ stands for a member selected from the group consisting of sulfur, oxygen, NH, N-alkyl, N-aryl and N-aralkyl and $z$ stands for a member selected from the group consisting of hydrogen and a hydrocarbon radical, being generally colorless to yellowish-colored, crystalline substances, soluble in organic solvents and in dilute aqueous mineral acids, being insoluble in aqueous alkalies, and being valuable intermediate products for the manufacture of dyestuffs and synthetic drugs.

6. Heterocyclic hydrazine compounds of the general formula:

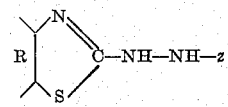

wherein R stands for a radical of the benzene series and $z$ stands for a member selected from the group consisting of hydrogen and radicals of the benzene series, being generally colorless to yellowish-colored, crystalline substances, soluble in organic solvents and in dilute aqueous mineral acids, being insoluble in aqueous alkalies, and being valuable intermediate products for the manufacture of dyestuffs and synthetic drugs.

7. The heterocyclic hydrazine compound of the formula:

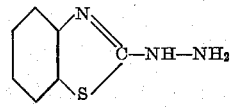

being a crystalline substance of the melting point 205° C. and being a valuable intermediate product for the manufacture of dyestuffs and synthetic drugs.

OTTO BAYER.
ERNST HERDIECKERHOFF.
HANS SCHINDHELM.